US008744260B2

(12) United States Patent
Shida

(10) Patent No.: US 8,744,260 B2
(45) Date of Patent: Jun. 3, 2014

(54) APERTURE CONTROL DEVICE AND CAMERA

(71) Applicant: Nikon Corporation, Tokyo (JP)

(72) Inventor: Masaru Shida, Sendai (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/850,772

(22) Filed: Mar. 26, 2013

(65) Prior Publication Data

US 2013/0209081 A1    Aug. 15, 2013

Related U.S. Application Data

(63) Continuation of application No. 13/444,442, filed on Apr. 11, 2012, now abandoned, which is a continuation of application No. 13/067,730, filed on Jun. 22, 2011, now abandoned, which is a continuation of application No. 12/926,196, filed on Nov. 1, 2010, now abandoned, which is a continuation of application No. 12/222,168, filed on Aug. 4, 2008, now abandoned.

(30) Foreign Application Priority Data

Aug. 6, 2007    (JP) ................................. 2007-204452

(51) Int. Cl.
 G03B 7/10    (2006.01)
 G03B 9/02    (2006.01)
(52) U.S. Cl.
 USPC ............ 396/260; 396/505; 396/529; 348/363
(58) Field of Classification Search
 USPC .......... 396/257, 260, 505, 506; 359/739, 740; 348/221.1, 362, 363
 See application file for complete search history.

(56) References Cited

U.S. PATENT DOCUMENTS

| 3,950,766 A | 4/1976 | Erlichman et al. |
| 4,396,272 A | 8/1983 | Shono et al. |
| 2008/0075453 A1 | 3/2008 | Utz |

FOREIGN PATENT DOCUMENTS

| JP | A-57-085034 | 5/1982 |
| JP | A-58-083825 | 5/1983 |
| JP | A-62-159132 | 7/1987 |
| JP | U-05-8549 | 2/1993 |
| JP | U-05-50437 | 7/1993 |
| JP | A-08-328080 | 12/1996 |
| JP | A-11-282043 | 10/1999 |

OTHER PUBLICATIONS

Apr. 30, 2010 Office Action issued in U.S. Appl. No. 12/222,168.
Dec. 22, 2010 Office Action issued in U.S. Appl. No. 12/926,196.
Oct. 12, 2011 Office Action issued in U.S. Appl. No. 13/067,730.
Sep. 26, 2012 Office Action issued in U.S. Appl. No. 13/444,442.
Jul. 17, 2012 Office Action issued in U.S. Appl. No. 13/444,442.
Jun. 19, 2012 Office Action issued in Japanese Patent Application No. 2007-204452 (with translation).

*Primary Examiner* — Clayton E Laballe
*Assistant Examiner* — Leon W Rhodes, Jr.
(74) *Attorney, Agent, or Firm* — Oliff PLC

(57) ABSTRACT

An aperture control device includes: an aperture first driving member that controls an aperture of a diaphragm through which light flux passes; an aperture second driving member that drives the aperture first driving member; a motor that drives the aperture second driving member; a detection device that detects start of movement of the aperture first driving member caused by the aperture second driving member driven by the motor; and a motor control device that controls an aperture value of the diaphragm by controlling a rotational amount of the motor after the detection device detects the start of movement of the aperture first driving member.

10 Claims, 10 Drawing Sheets

MAXIMUM APERTURE

APERTURE STOP-DOWN

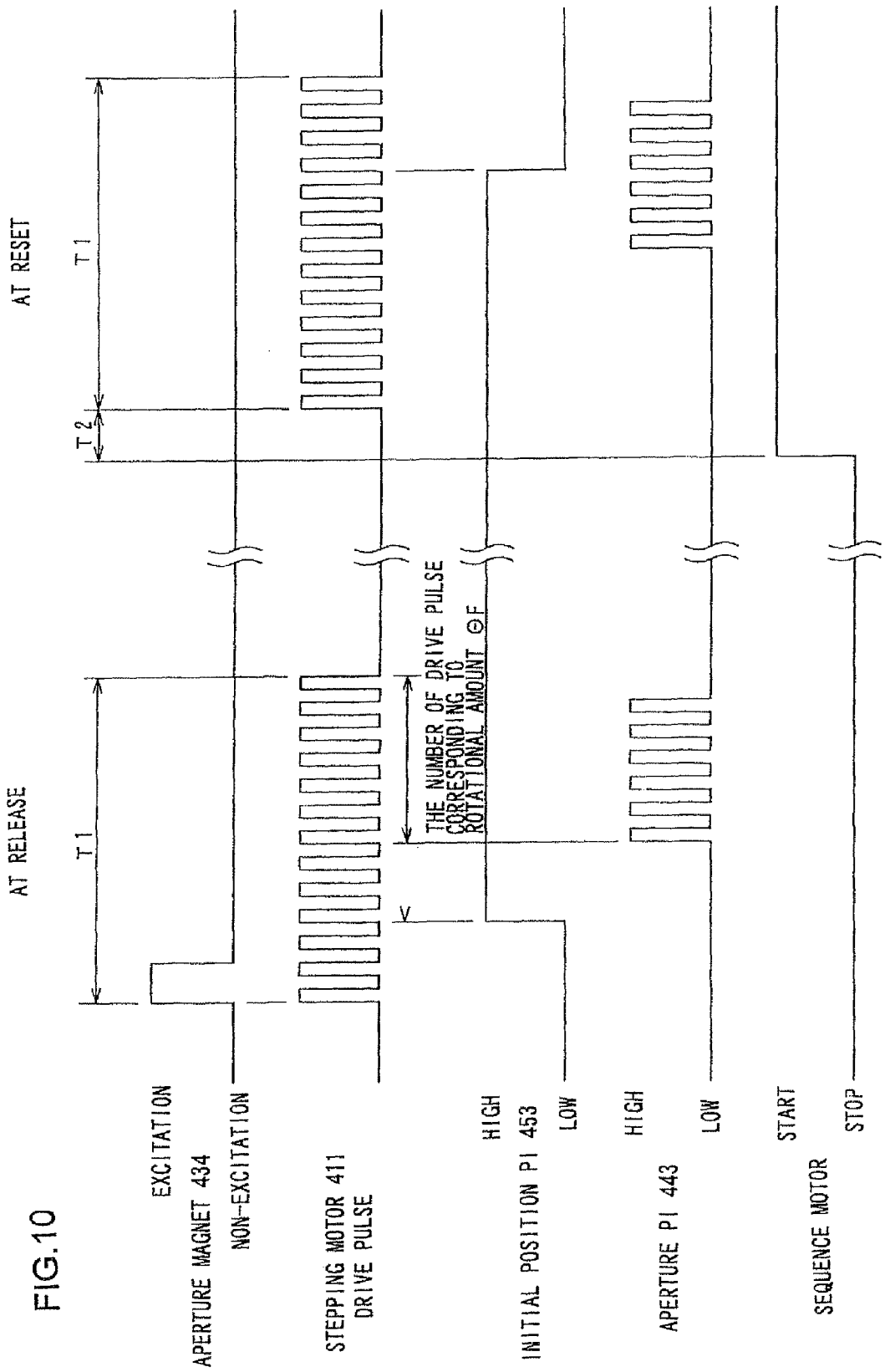

APERTURE CONTROL DEVICE AND CAMERA

INCORPORATION BY REFERENCE

This is a Continuation of application Ser. No. 13/444,442 filed Apr. 11, 2012, which is a Continuation of application Ser. No. 13/067,730 filed Jun. 22, 2011, which is Continuation of application Ser. No. 12/926,196 filed Nov. 1, 2010, which is a Continuation of application Ser. No. 12/222,168 filed Aug. 4, 2008. This application claims the benefit of Japanese Patent Application No. 2007-204452, filed Aug. 6, 2007. The entire disclosures of the prior applications are hereby incorporated by reference herein in their entirety.

BACKGROUND OF THE INVENTION

1. Field of the Invention

The present invention relates to an aperture control device that drives an aperture of a lens and a camera that includes the aperture control device.

2. Description of Related Art

An aperture control device used for a camera and the like is disclosed in Japanese Laid Open Patent Publication No. H11-282043. The aperture control device increases driving amount of an aperture driving lever on the camera by a gear train and detects, as the driving amount of the aperture driving lever, a gear rotation speed by a photo interrupter and the like. When the detected value is a predetermined value, the aperture control device puts a brake on the gear train to stop the gear train and the aperture driving lever that is interlocked with the gear train so as to obtain an intended aperture value.

A conventional aperture control device puts a brake on a gear train by engaging a pawl to a ratchet wheel of the gear train. An instruction for starting engaging the pawl is issued, taking into account the time between beginning of the movement of the pawl and engaging of the pawl to a ratchet wheel. However, if the pawl abuts against a tooth top part of the ratchet wheel, the pawl bounces and causes a stop phase of the gear train to be shifted. IN this case, a desired aperture value may not be obtained.

SUMMARY OF THE INVENTION

An aperture control device according to a first aspect of the present invention, comprises: an aperture first driving member that controls an aperture of a diaphragm through which light flux passes; an aperture second driving member that drives the aperture first driving member; a motor that drives the aperture second driving member; a detection device that detects start of movement of the aperture first driving member caused by the aperture second driving member driven by the motor; and a motor control device that controls an aperture value of the diaphragm by controlling a rotational amount of the motor after the detection device detects the start of movement of the aperture first driving member.

According to a second aspect of the present invention, it is preferable that the aperture control device according to the first aspect further comprises: a worm gear that transmits driving force of the motor to the aperture second driving member, wherein: after the motor control device stops the driving of the motor and the aperture value is controlled to a predetermined value, the aperture first driving member and the aperture second driving member are fixed so as not to move using self-locking of the worm gear.

According to a third aspect of the present invention, it is preferable that the aperture control device according to the first aspect further comprises: the motor being a stepping motor; and a stop-down biasing device that applies a biasing force on the aperture second driving member such that the aperture is driven in a direction of stop-down, wherein: the motor control device controls the aperture value of the lens by controlling a rotational amount of the stepping motor after the detection device detects the start of movement of the aperture first driving member.

According to a fourth aspect of the present invention, in the aperture control device according to the third aspect, the stepping motor may drive the aperture second driving member such that the diaphragm is driven in a direction for widening the aperture against the biasing force of the stop-down biasing device.

According to a fifth aspect of the present invention, the aperture control device according to the third aspect may further comprises: an engaging member that engages the aperture first driving member and the aperture second driving member with each other at least when the aperture is stopped down.

According to a sixth aspect of the present invention, it is preferable that the aperture control device according to the third aspect further comprises: a maximum aperture biasing device that applies a biasing force on the aperture second driving member as the aperture second driving member is driven in a direction for widening the aperture, wherein: the motor control device controls rotation of the stepping motor such that the aperture second driving member on which the biasing force is applied by the maximum aperture biasing device is driven in the direction for widening the aperture.

According to a seventh aspect of the present invention, the aperture control device according to the third aspect may further comprises: an aperture second driving member initial position detection device that detects an initial position of the aperture second driving member.

According to a eighth aspect of the present invention, in the aperture control device according to the third aspect, the motor control device may start rotation of the stepping motor such that the stepping motor drives the aperture second driving member in the direction of stop-down before the biasing force of the stop-down biasing device is applied on the aperture second driving member.

According to a ninth aspect of the present invention, in the aperture control device according to the third aspect, the motor control device may start rotation of the stepping motor such that the stepping motor drives the aperture second driving member in the direction for widening the aperture after the biasing force of the maximum aperture biasing device is applied on the aperture second driving member.

A camera according to a tenth aspect of the present invention, comprises the aperture control device according to the first aspect.

BRIEF DESCRIPTION OF THE DRAWINGS

FIG. 10 is a timing chart of the camera according to the present embodiment.

DESCRIPTION OF PREFERRED EMBODIMENTS

Figure 1:
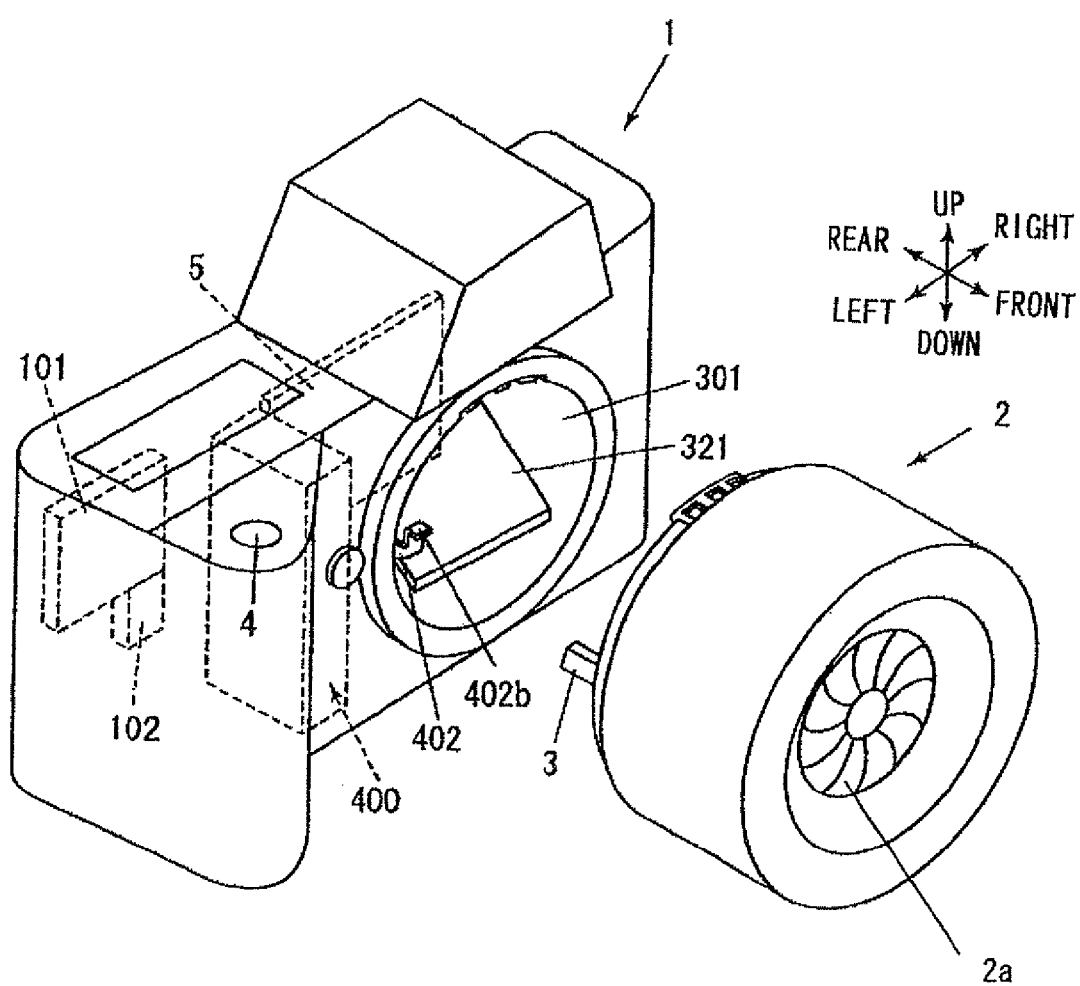
FIG. 1 is a perspective view of a camera body of an electronic camera to which an aperture control device in accordance with the present invention, and a photographic lens to be mounted on the camera body.

An aperture control device and a camera in accordance with an embodiment of the present invention are now explained with reference to FIGS. 1 through 10. FIG. 1 is a perspective view of a camera body 1 of a single-lens reflex camera, which is an electronic camera in which the aperture control device in accordance with the present invention is installed, and a photographic lens 2 to be mounted on the camera body 1.

The camera body 1 is provided with a release button 4, a CCD (charge coupled device) 5, which is an image sensor, a control circuit 101 that controls various parts of the camera body 1, a stepping motor driver 102, and a diaphragm mechanism 400. The photographic lens 2 is provided with a group of lenses (not herein figured), a diaphragm 2a, and the like. The diaphragm 2a adjusts an amount of light flux of a subject passing through the group of lenses by controlling its aperture. Along an imaging optical path 301 in the camera body 1, the subject image is guided from the photographic lens 2 to the CCD 5. In the imaging optical path 301, a main mirror 321 is provided. The electronic camera according to the present embodiment controls a charge storage time of the CCD 5 by a control signal from the control circuit 101 so as to control an exposure time. This is called an electronic shutter.

When the photographic lens 2 is mounted on the camera body 1, an aperture lever 3 on the lens comes into contact with an abutting part 402b of an aperture lever 402 on the camera. The aperture lever 3 on the lens is driven by the aperture lever 402 on the camera (hereinafter called an aperture lever) and controls an aperture value of the diaphragm 2a at a predetermined value. It should be noted that, according to the present embodiment, the side of the camera body 1 on which the photographic lens 2 is mounted is defined as a front, while the side of the camera body 1 on which the CCD 5 is mounted is defined as a rear. Each of the figures indicates the left, right, top and bottom of the camera body 1 in its own perspective.

---Conventional Diaphragm Mechanism---

A conventional diaphragm mechanism increases a driving amount of the aperture lever 402 that abuts against the aperture lever 3 on the lens by a gear train and detects the driving amount of the aperture lever 402 by a photo interrupter and the like as a rotation speed of the gear. When the detected value matches with a predetermined value, the conventional diaphragm mechanism puts a brake on the gear train and stops the gear train and the aperture lever 402 that is interlocked with the gear train so as to obtain a desired aperture value. In other words, the conventional diaphragm mechanism controls the driving amount of the aperture lever 402 based on the number of pulse signals output from the photo interrupter.

On the other hand, the diaphragm mechanism 400 according to the present embodiment controls the driving amount of the aperture lever 402 based on a driving amount of a stepping motor 411 in place of the number of pulse signals output from the photo interrupter. The diaphragm mechanism 400 according to the present embodiment is now explained.

---Diaphragm Mechanism 400---

Figure 2:
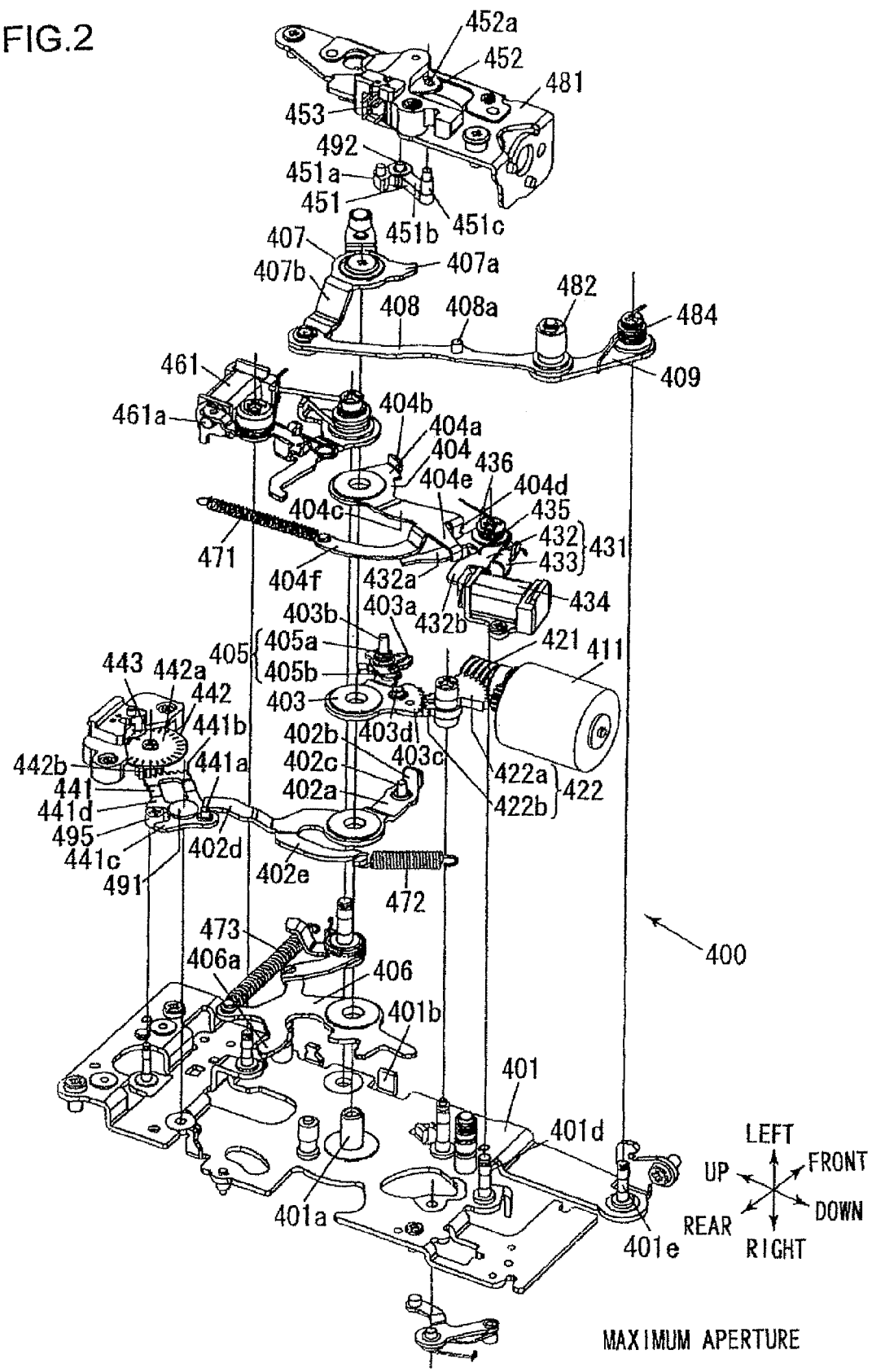
FIG. 2 is an exploded view of key components of a diaphragm mechanism incorporated in the camera body.
Figure 3:
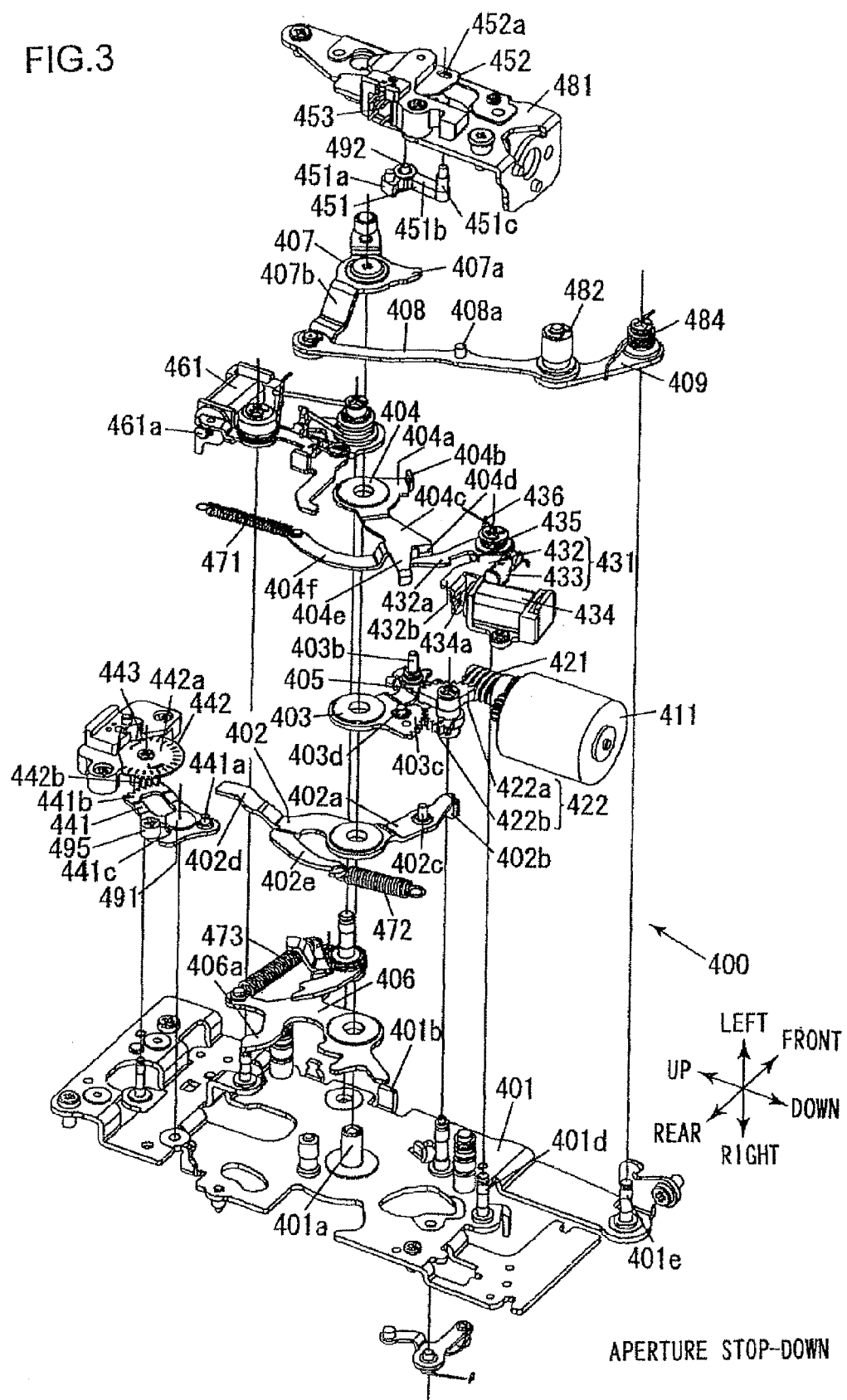
FIG. 3 is an exploded view of key components of the diaphragm mechanism incorporated in the camera body.
Figure 4:
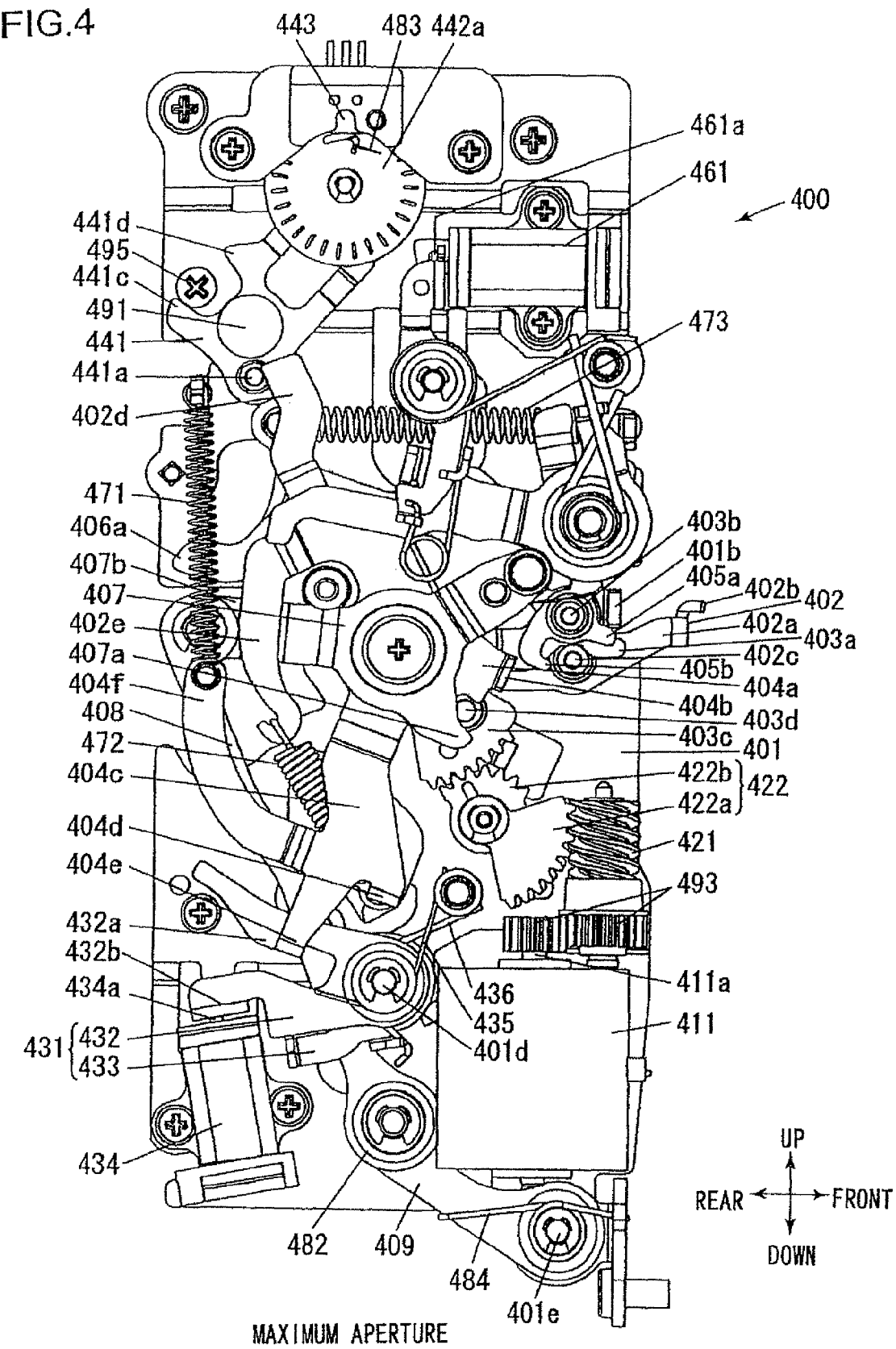
FIG. 4 is a side view of a part of the diaphragm mechanism seen from the left of the camera body.
Figure 5:
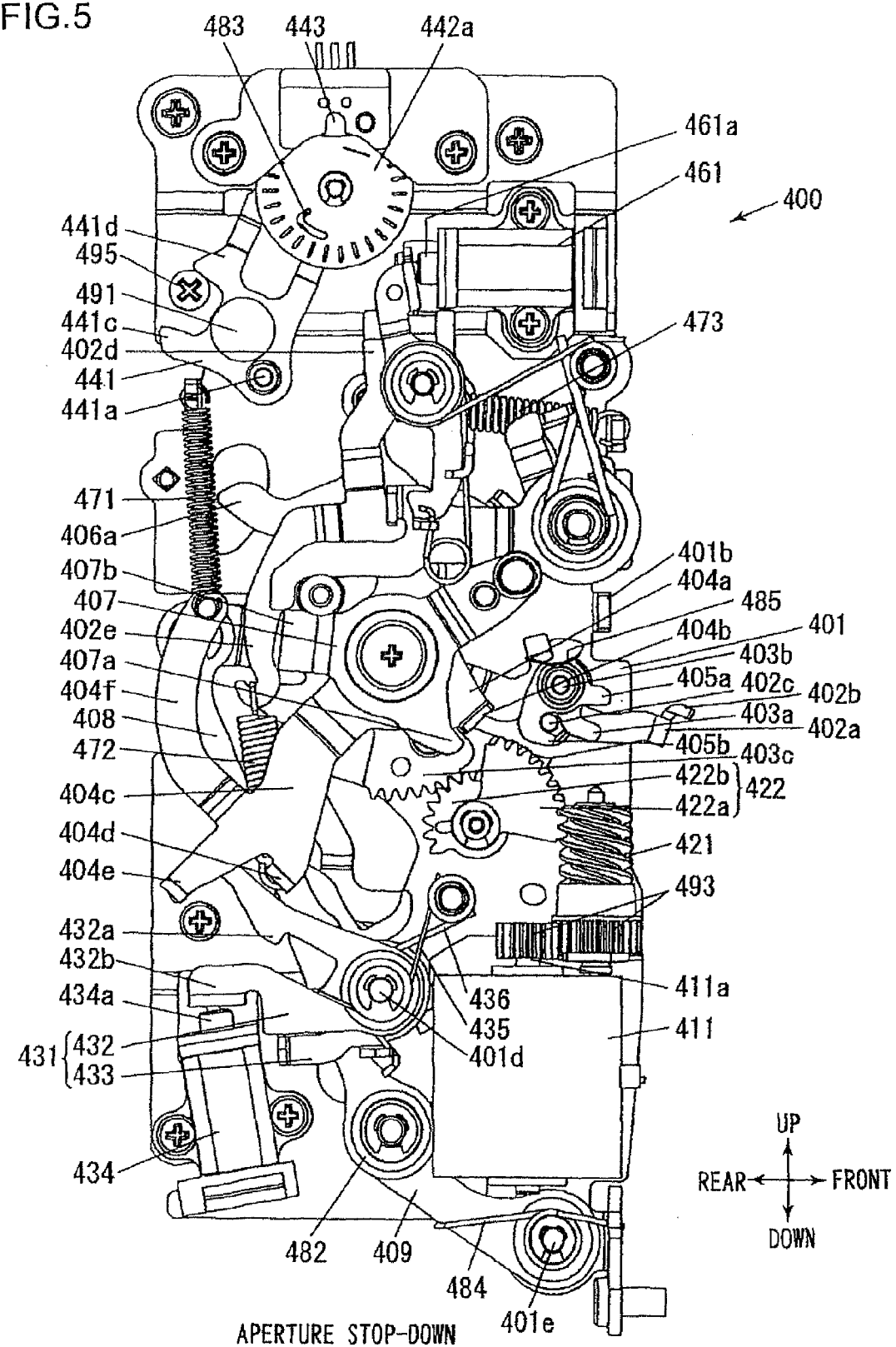
FIG. 5 is a side view of a part of the diaphragm mechanism seen from the left of the camera body.
Figure 6:
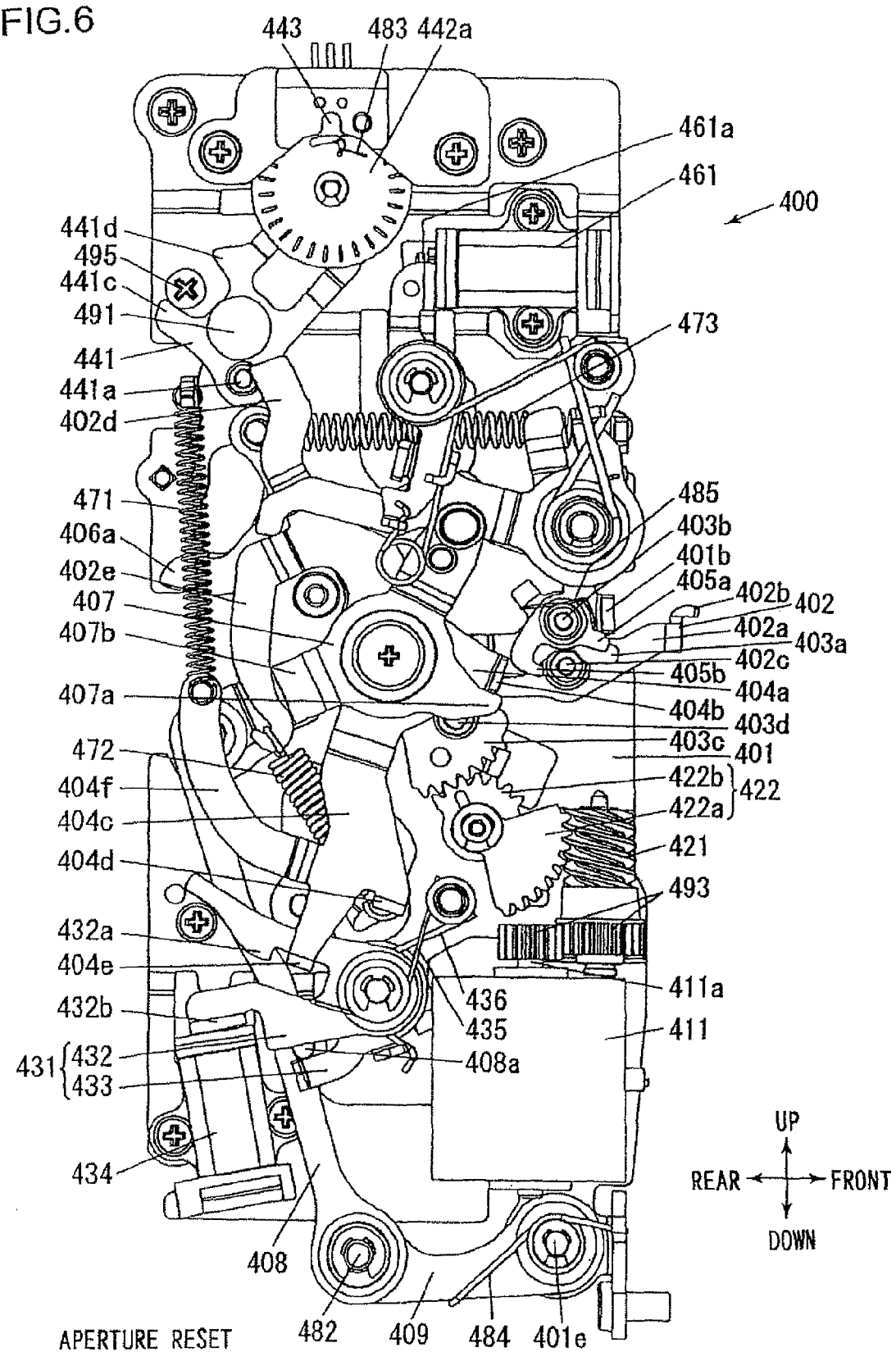
FIG. 6 is a side view of a part of the diaphragm mechanism seen from the left of the camera body.

FIGS. 2 and 3 are exploded views of key components of the diaphragm mechanism 400 incorporated in the camera body 1. FIG. 2 shows a state before a shutter release operation is started (in a maximum aperture state). FIG. 3 shows a state in which a lens is stopped down (in a minimum aperture state). FIGS. 4 through 6 are side views of a part of the diaphragm mechanism 400 seen from the left of the camera body. FIG. 4 shows a state in which the aperture is maximum. FIG. 5 shows a state in which the aperture is minimum. FIG. 6 shows a state in which a reset operation is performed so that the aperture is maximum, that is, so as to return to the state in which the aperture is maximum.

Figure 7:
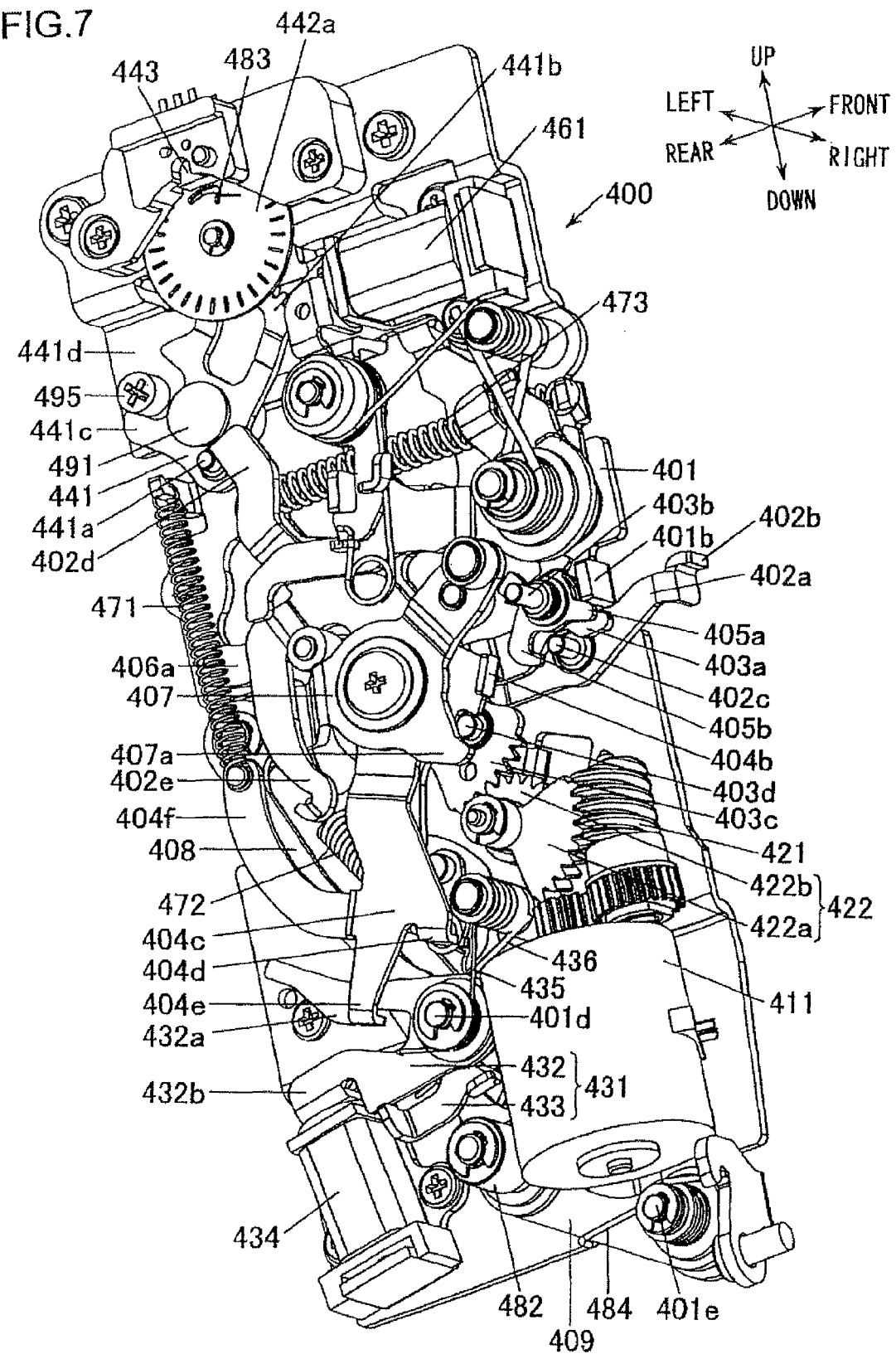
FIG. 7 is a perspective view of a part of the diaphragm mechanism seen diagonally from the bottom left of the camera body.
Figure 8:
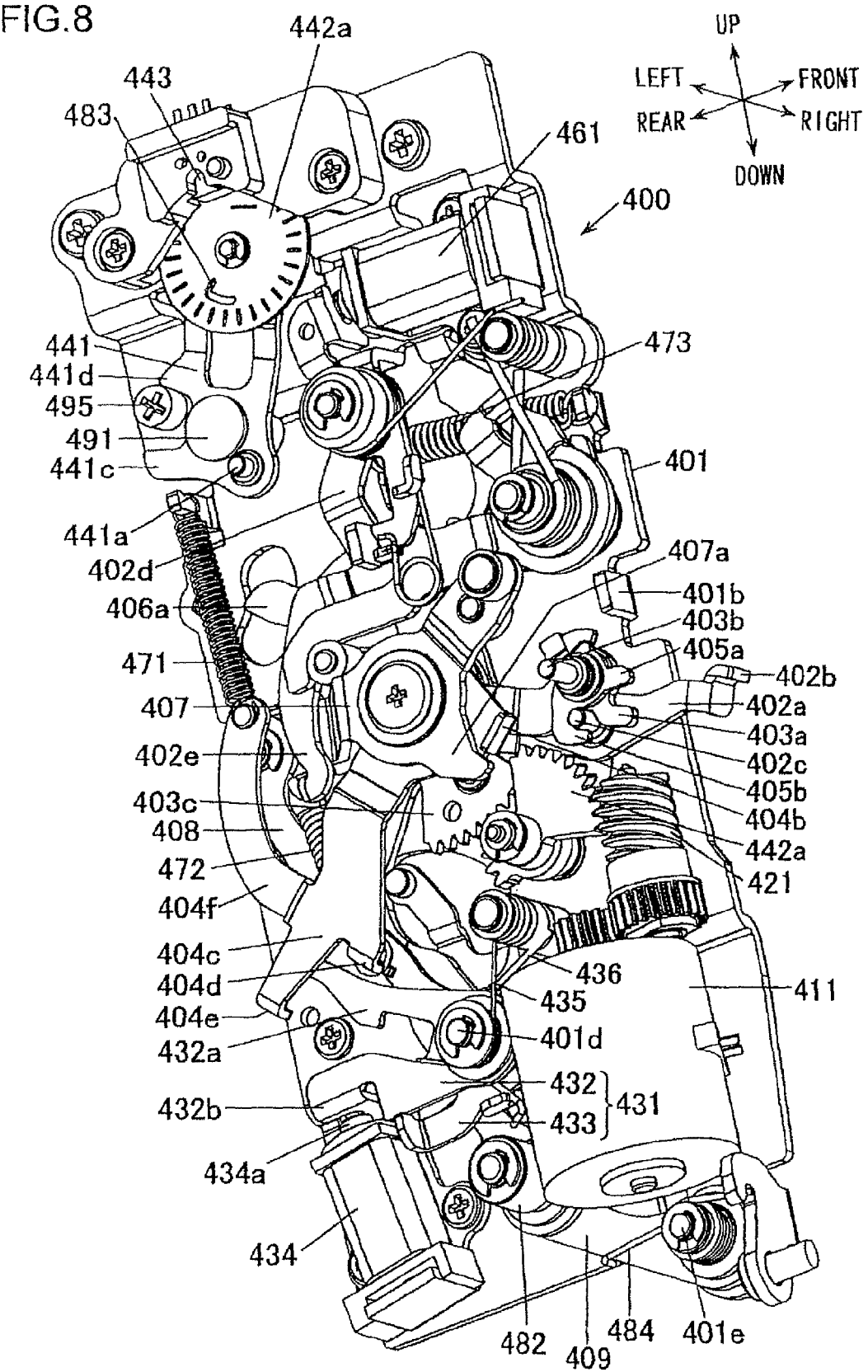
FIG. 8 is a perspective view of a part of the diaphragm mechanism seen diagonally from the bottom left of the camera body.
Figure 9:
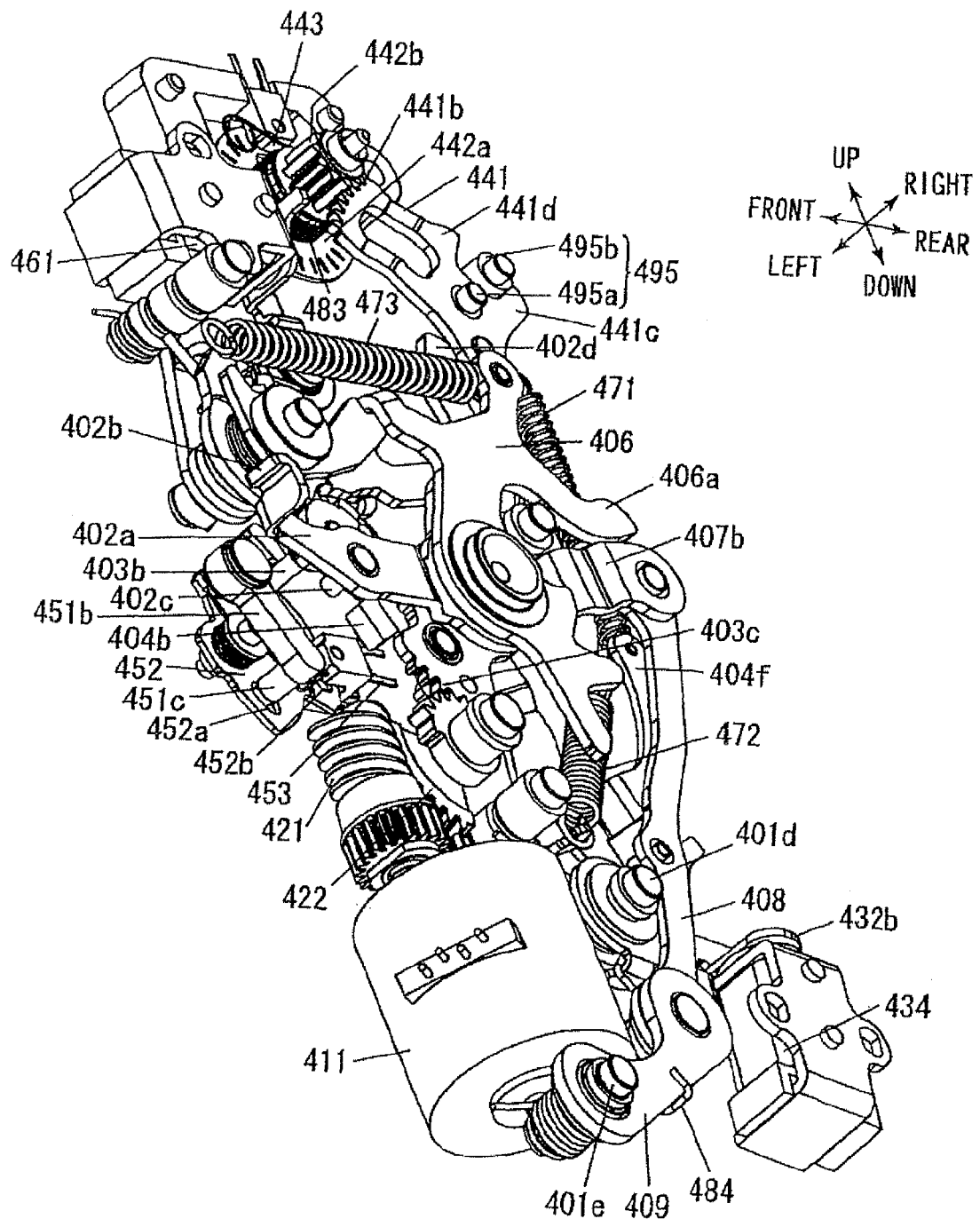
FIG. 9 is a perspective view of a front part of the diaphragm mechanism seen diagonally from the bottom right of the camera body.

FIGS. 7 and 8 are perspective views of a part of the diaphragm mechanism 400 seen diagonally from the bottom left of the camera body. FIG. 7 shows a state in which the aperture is maximum. FIG. 8 shows a state in which the aperture is minimum. FIG. 9 is a perspective view of a front part of the diaphragm mechanism 400 seen diagonally from the bottom right of the camera body, which shows a state in which the aperture is maximum. It is to be noted that the left, right, top and bottom in FIGS. 2 through 9 are defined in accordance with the left, right, top and bottom of the camera body 1 in which the diaphragm mechanism 400 is incorporated.

Following descriptions on components of the diaphragm mechanism 400 are made, assuming that postures, positions, directions in which an arm extends, relationships with other members, etc. are in the state in which the aperture is maximum as indicated in FIGS. 2, 4, 7, and 9. As FIGS. 2 and 4 show, the diaphragm mechanism 400 includes a board 401, the aperture lever 402, an aperture drive lever 403, an aperture reset lever 404, an aperture lever pawl 405, a stepping motor 411, an aperture first gear 421, an aperture second gear 422, an aperture reset engaging lever 431, and an aperture magnet 434. The diaphragm mechanism 400 is an aperture control device that controls the aperture of the photographic lens 2.

The board 401 is a plate-like member on which components of the diaphragm mechanism 400 are mounted. The aperture lever 402 is a lever pivotally supported around a boss 401a provided on the board 401 and is an aperture drive member that drives the aperture of the photographic lens 2.

The aperture lever 402 is provided with arms 402a, 402d, and 402e, and the abutting part 402b. The aperture lever 402 is provided with an aperture reset spring 472 engaged with the arm 402e at one end of the spring. The aperture lever 402 is connected to the aperture reset lever 404 to be detailed later through the aperture reset spring 472 and is biased counterclockwise seen from the left side of the camera body 1 (hereinafter called simply "counterclockwise") by the aperture reset spring 472. The arm 402a that extends forward is provided with the abutting part 402b at the front end. The abutting part 402b comes into contact with the aperture lever 3 on the lens when the photographic lens 2 is attached to the camera body 1. The arm 402a is embedded with a pin 402c that extends leftward on the left side of the arm 402a.

The aperture driving lever 403 is a lever that drives the aperture lever 402 and is pivotally supported around the boss 401a on the board 401. The aperture driving lever 403 is provided with an arm 403a and a sector gear part 403c. The arm 403a extends forward. When the lens is stopped down, as described below, the arm 403a presses downward the pin 402c on the arm 402a of the aperture lever 402. The sector gear part 403c is provided along a circular arc around the boss 401a and meshes with the aperture second gear 422, which is detailed later. The arm 403a is embedded with a pin 403b. The pin 403b pivotally supports the aperture lever pawl 405, which is detailed later. The sector gear part 403c is embedded with a pin 403d in its vicinity. The aperture driving lever 403 is rotated by the stepping motor 411, which is detailed later.

The aperture reset lever 404 is a lever that applies a biasing force of the a stop-down spring 471 to the aperture driving lever 403 and is pivotally supported around the boss 401a on the board 401. The aperture reset lever 404 is provided with an arm 404a that extends forward and obliquely downward and an arm 404c that extends downward. The arm 404a is provided with a bending part 404b that is bent leftward at the end of the arm 404a.

The arm 404c is provided with an aperture reset spring engaging part 404d, an abutting part 404e, and a stop-down spring engaging part 404f. The aperture reset spring engaging part 404d is engaged with the other end of the aperture reset spring 472. The abutting part 404e comes into contact with the aperture reset engaging lever 431, which is described below. The stop-down spring engaging part 404f is engaged with an end of the stop down spring 471. The other end of the stop down spring 471 is engaged with the board 401. Therefore, the aperture reset lever 404 is biased clockwise seen from the left side of the camera body 1 (hereinafter called simply "clockwise") by the stop down spring 471. However, since the abutting part 404e abuts against the aperture reset engaging lever 431, the aperture reset lever 404 is stopped in a position (rotation phase or position) shown in FIGS. 2, 4, and 7 against the biasing force of the stop-down spring 471.

The aperture lever pawl 405 is, as described above, a member that is pivotally supported on the pin 403b on the aperture driving lever 403 and is provided with an arm 405a and an engaging part (pawl) 405b. The aperture lever pawl 405 is, as described below, engages the pin 402c on the arm 402a of the aperture lever 402 with the pawl 405b when the lens is stopped down. In other words, the aperture lever pawl 405 locks the aperture lever 402 and the aperture driving lever 403 together when the lens is stopped down. The aperture lever pawl 405 is biased counterclockwise in the figure by a spring 485 (refer to FIG. 5).

The stepping motor 411 is, for instance, a claw-pole PM stepping motor. A rotational speed, rotational amount, stop phase (stop position), etc. of an output shaft 411a (FIG. 4) are controlled by the stepping motor driver 102. The stepping motor 411 rotates the aperture first gear 421 through a reduction gear 493. In other words, a rotation speed of the output shaft 411a of the stepping motor 411 is reduced by the reduction gear 493 and is transmitted to the aperture first gear 421. The aperture first gear 421 is a worm that is to be rotated by the stepping motor 411. The stepping motor driver 102 is a driver that controls a drive of the stepping motor 411.

The aperture second gear 422 is a gear for reducing the rotation speed of the aperture first gear 421 so as to transmit it to the aperture driving lever 403. The aperture second gear 422 is provided with sector gear parts 422a and 422b. The sector gear part 422a is a gear that meshes with the aperture first gear 421 and is a part of a worm wheel. In other words, the aperture first gear 421 and the sector gear part 422a of the aperture second gear 422 constitute a worm gear. The sector gear part 422b meshes with the sector gear part 403c of the aperture driving lever 403.

The aperture reset engaging lever 431 is the lever that engages the aperture reset lever 404 as described above. The aperture reset engaging lever 431 includes two levers, i.e., an abutting lever 432 that abuts against the abutting part 404e of the aperture reset lever 404 and an overcharge absorbing lever 433 for absorbing overcharge at the time of reset. The abutting lever 432 includes an abutting part 432a that abuts against the abutting part 404e of the aperture reset lever 404 and a moving core engaging part 432b that engages a moving core of the aperture magnet 434, which is described below.

Both of the abutting lever 432 and the overcharge absorbing lever 433 are pivotally supported around a shaft 401d provided on the board 401. In the aperture reset engaging lever 431, the abutting lever 432 is biased counterclockwise in the figure around the shaft 401d by a spring 435. The overcharge absorbing lever 433 is biased clockwise in the figure around the shaft 401d. That is, the aperture reset engaging lever 431 is configured such that the abutting lever 432 and the overcharge absorbing lever 433 are biased to and abutted against each other by the spring 435 and are integrated together. The aperture reset engaging lever 431 is biased clockwise in the illustration by a spring 436.

The aperture magnet 434 is a publicly known combination magnet that holds an inserted moving core 434a using a permanent magnet and that disengageably releases the moving core 434a by energization of an exciting coil. The end of the moving core 434a exposed from the aperture magnet 434 engages the moving core engaging part 432b of the abutting lever 432.

In addition to the components mentioned above, the diaphragm mechanism 400 includes a mirror up lever 406 for lifting up the main mirror 321, a mirror up magnet 461, a charge lever 407 for performing reset (charging operation) after the shutter release, a charge link board 408, and a charge link lever 409. The diaphragm mechanism 400 further includes an aperture PI (photo Interrupter) blade lever 441, an aperture PI blade 442, an aperture PI 443, an initial position PI blade rotation lever 451, an initial position PI blade 452, and an initial position PI 453.

The mirror up lever 406, which is a lever for swinging the main mirror 321, is pivotally supported around the boss 401a of the board 401, and is biased clockwise by a mirror up spring 473 (FIG. 2). For lifting up the main mirror 321, the mirror up lever 406 rotates clockwise by a biasing force of the mirror up spring 473 so that an arm 406a abuts against a shaft not herein illustrated that drives the main mirror 321 and pushes the shaft upward. The mirror up magnet 461 is a publicly known combination magnet that holds an inserted moving core 461a using a permanent magnet and that disengageably releases the moving core 461a by energization of an exciting coil.

The charge lever 407, which is a lever to be rotated at the time of reset, is pivotally supported around the boss 401a of the board 401. The charge lever 407 includes arms 407a and 407b. The arm 407a is a member that abuts against the bending part 404b of the aperture reset lever 404 at the time of reset and pushes the bending part 404b counterclockwise. The arm 407b is pivotally supported around the upper end of the charge link board 408, which is described below.

The charge link board 408 is a plate-like member for transmitting a charging power by a sequence motor not herein figured to the charge lever 407 and the like. As explained above, the upper end of the charge link board 408 is pivotally supported around the arm 407b of the charge lever 407. The lower end of the charge link board 408 is pivotally supported around an end of the charge link lever 409, which is described below. The lower end of the charge link board 408 is mounted with a charge roller 482. The charge roller 482 is a roller into which a charging power by the sequence motor not herein figured is input, and is to be pressed downward by the charging power by the sequence motor at the time of reset. The charge link board 408 is provided with a boss 408a on its left side. The boss 408a abuts against the overcharge absorbing lever 433 of the aperture reset engaging lever 431 at the time of reset and rotates the aperture reset engaging lever 431 counterclockwise.

The charge link lever 409 is a lever that controls the movement of the lower end of the charge link board 408. The end of the charge link lever 409 is pivotally supported around the lower end of the charge link board 408, while the other end of the charge link lever 409 is pivotally supported around a shaft 401e on the board 401. The board 401, the charge lever 407, the charge link board 408, and the charge link lever 409 constitute a four bar linkage. The charge link lever 409 is biased clockwise by a spring 484.

The aperture PI blade lever 441, which is a lever that abuts against the aperture lever 402, rotates according to a rotational position of the aperture lever 402. The aperture PI blade lever 441 is pivotally supported by a shaft 491 inserted into a shaft hole of the board 401. The aperture PI blade lever 441 is provided with a pin 441a that abuts against the arm 402d of the aperture lever 402 and a gear part 441b that meshes with a gear part of the aperture PI blade 442, which is described below.

In the case where the aperture lever 402 is rotated such that the aperture is near the maximum, the arm 402d of the aperture lever 402 abuts against the pin 441a of the aperture PI blade lever 441. While, in the case where the aperture lever 402 is rotated such that the aperture is the minimum, the arm 402d of the aperture lever 402 is drawn apart from the pin 441a of the aperture PI blade lever 441. In other words, only when the aperture lever 402 is rotated so as to set the aperture close to the maximum, the aperture lever 402 rotates the aperture PI blade lever 441.

A rotation range of the aperture PI blade lever 441 is controlled by an eccentric pin 495. In a state in which the aperture is maximum, as shown in FIG. 4, the clockwise rotation of the aperture PI blade lever 441 is restricted by an engaging part 441c abutting against the eccentric pin 495. In a state in which the aperture is minimum, as shown in FIG. 5, the counterclockwise rotation of the aperture PI blade lever 441 is restricted by the engaging part 441c abutting against the eccentric pin 495.

The aperture PI blade 442, which is a member to be rotated by the aperture PI blade lever 441, is provided with a slit blade part 442a and a gear part 442b. The slit blade part 442a is a disk-shaped member in which a plurality of slits are disposed radially. The gear part 442b, which is a gear disposed on the right side of the slit blade part 442a, meshes with the gear part 441b of the aperture PI blade lever 441 as explained above. Therefore, the aperture PI blade 442 is rotated in response to rotation of the aperture PI blade lever 441. The aperture PI blade 442 is biased clockwise in the illustration by a spring 483 (refer to FIGS. 2, 7, and 9).

The aperture PI 443 is an optical sensor, specifically a photo interrupter. When a slit of the slit blade part 442a moves in the proximity of a detection part by rotation of the aperture PI blade 442, the aperture PI 443 outputs on/off signals (pulse signals) according to a position of the slit. The pulse signals from the aperture PI 443 are output to the control circuit 101. The control circuit 101 determines whether the aperture PI blade 442 is rotating or not according to the pulse signals output from the aperture PI 443, and calculates a rotation amount of the aperture PI blade 442. In other words, according to the pulse signals output from the aperture PI 443, the control circuit 101 determines whether the aperture lever 402 is rotated or not and calculates its rotation amount with respect to the aperture lever 402 rotated in a rotational position where the aperture is close to the maximum.

As FIGS. 2 and 9 indicate, the initial position PI blade rotation lever 451, which is a lever that abuts against the pin 403b on the aperture driving lever 403, rotates in accordance with rotational position of the aperture driving lever 403. The initial position PI blade rotation lever 451 is pivotally supported by a shaft 492 on an initial position detection board 481, which is a board to be fixed to the board 401. The initial position PI blade rotation lever 451 is provided with an arm 451a against which the pin 403b abuts and an arm 451b that rotates the initial position PI blade 452, which is described below. The end of the arm 451b is provided with a shaft 451c that extends leftward substantially perpendicularly to the direction in which the arm 451b extends.

In the case where the aperture driving lever 403 is rotated such that the aperture is close to the maximum, the pin 403b on the aperture driving lever 403 abuts against the arm 451a of the initial position PI blade rotation lever 451. While, in the case where the aperture driving lever 403 is rotated such that the aperture is the minimum, the pin 403b is drawn apart from the arm 451a. In other words, only when the aperture driving lever 403 is rotated such that the aperture is close to the maximum, the aperture driving lever 403 rotates the initial position PI blade rotation lever 451.

The initial position PI blade 452, which is a fan-shaped member that is rotated by the initial position PI blade rotation lever 451, includes an initial position PI blade rotation lever engaging hole 452a and an initial position detection opening 452b (refer to FIG. 9). The shaft 451c of the initial position PI blade rotation lever 451 is inserted into the initial position PI blade rotation lever engaging hole 452a. Therefore, the initial position PI blade 452 is rotated in response to rotation of the initial position PI blade rotation lever 451. In other words, as the aperture driving lever 403 is rotated such that the aperture is close to the maximum, the initial position PI blade 452 is rotated to a rotational position that corresponds to that of the aperture driving lever 403.

The initial position PI 453 is an optical sensor, specifically a photo interrupter. When the initial position detection opening 452b of the initial position PI blade 452 moves in the proximity of a detection part by rotation of the initial position PI blade 452, the initial position PI 453 outputs on/off signals according to a position of the initial position detection opening 452b. The on/off signals from the initial position PI 453 are output to the control circuit 101. The control circuit 101 determines a rotation phase of the initial position PI blade 452, that is, a rotational position of the aperture driving lever 403, according to the on/off signals output from the initial position PI 453.

---Maximum Aperture---

In the maximum aperture state, as shown in FIGS. 4 and 7, the aperture lever 402 is rotated counterclockwise and is held at the rotated position. The aperture lever 402 is applied with a counterclockwise biasing force by the aperture reset spring 472. In the case where the camera body 1 is mounted with the photographic lens 2, the abutting part 402b of the aperture lever 402 abuts against the aperture lever 3 on the lens. This causes the aperture lever 402 to stop in a position slightly rotated clockwise, compared to the position in the case where the camera body 1 is not mounted with the photographic lens 2. The then position where the aperture lever 402 stops is called "stop position of the aperture lever 402 with the lens mounted before shutter release." On the other hand, the position where the aperture lever 402 stops when the camera body 1 is not mounted with the photographic lens 2 is called "stop position of the aperture lever 402 without the lens mounted before shutter release."

The aperture driving lever 403 is stopped with the arm 403a drawn apart from the pin 402c on the aperture lever 402. The then position where the aperture driving lever 403 stops is called "stop position of the aperture driving lever 403 before shutter release." The aperture driving lever 403 is, as mentioned above, configured to be rotated by the stepping motor 411. The worm gear composed of the aperture first gear 421 and the aperture second gear 422 comes between the stepping motor 411 and the aperture driving lever 403. Therefore, even if the aperture driving lever 403 is applied with an external force, as long as the stepping motor 411 is stopped, the aperture driving lever 403 does not rotate because of self-locking of the worm gear. The "stop position of the aperture driving lever 403 before shutter release" is defined by a position at which the output shaft 411a of the stepping motor 411 stops.

The aperture lever pawl 405 is rotated clockwise against a biasing force of the spring 485 as the arm 405a abuts against a turn part 401b of the board 401, and is held in the rotated state. This causes the pawl 405b to draw apart from the pin 402c on the aperture lever 402 and release the pin 402c.

The aperture reset lever 404 is rotated counterclockwise against the biasing force of the stop-down spring 471 by the abutting part 404e abutting against the abutting part 432a of the abutting lever 432 (aperture reset engaging lever 431), and is held in the rotated state. In this state, the lower end of the arm 404a of the aperture reset lever 404 slightly draws apart from the pin 403d provided in the proximity of the sector gear part 403c of the aperture driving lever 403. The aperture reset engaging lever 431 is rotated counterclockwise against a biasing force of the spring 436 by the moving core 434a of the aperture magnet 434, and is held in the rotated state.

The mirror up lever 406 is engaged in the rotated state in which the mirror up lever is rotated counterclockwise against the biasing force of the mirror up spring 473. The mirror up magnet 461 holds the moving core 461a using a permanent magnet. Since the charge link lever 409 is rotated clockwise by a biasing force of the spring 484, the charge link board 408 moves upward and then stops, and the charge lever 407 is stopped in a state rotated clockwise.

Since the pin 441a is pressed backward by the arm 402d of the aperture lever 402, the aperture PI blade lever 441 is rotated clockwise and stopped. In the "stop position of the aperture driving lever 403 before shutter release," the pin 403b embedded on the arm 403a abuts against the arm 451a of the initial position PI blade rotation lever 451 and rotates the initial position PI blade rotation lever 451 clockwise (FIG. 2). This causes the initial position PI blade 452 to be rotated clockwise, and allows the light output from a detection part of the initial position PI 453 to pass through the initial position detection opening 452b (FIG. 9). As a result, a Low signal is output from the initial position PI 453.

In the case where the camera body 1 is not mounted with the photographic lens 2, the position at which the aperture lever 402 stops, that is, the "stop position of the aperture lever 402 without the lens mounted before shutter release" is restricted by the eccentric pin 495 via the aperture PI blade lever 441 (FIG. 4). In other words, when the aperture lever 402 rotates counterclockwise by a biasing force of the aperture reset spring 472, the arm 402d presses the pin 441a of the aperture PI blade lever 441 and rotates the aperture PI blade lever 441 clockwise. The clockwise rotation of the aperture PI blade lever 441, however, is, as explained above, restricted by the engaging part 441c abutting against the eccentric pin 495. The counterclockwise rotation of the aperture lever 402 is therefore restricted by the engaging part 441c abutting against the eccentric pin 495. Thus, the rotation phase or position of the aperture lever 402 when the engaging part 441c abuts against the eccentric pin 495 is to be the "stop position of the aperture lever 402 without the lens mounted before shutter release".

As shown in FIG. 9, the eccentric pin 495 includes a shaft 495a to be inserted into a hole of the board 401 not herein figured and an abutting part 495b that abuts against the aperture PI blade lever 441. The shaft 495a and the abutting part 495b are eccentric. Rotating the eccentric pin 495 on the board 401 therefore enables adjustment of the rotation phase of the aperture PI blade lever 441 when the engaging part 441c abuts against the eccentric pin 495 (the abutting part 495b), that is, the "stop position of the aperture lever 402 without the lens mounted before shutter release."

In the case where the camera body 1 is not mounted with the photographic lens 2, the abutting part 402b of the aperture lever 402 is exposed to outside as shown in FIG. 1. In the maximum aperture state, however, since the pawl 405b of the engaging lever pawl 405 releases pin 402c on the aperture lever 402 as described above, the aperture lever 402 is rotatable separately from the aperture driving lever 403. When the abutting part 402b of the aperture lever 402 is pressed down by an external force, the aperture lever 402 is rotated clockwise against a biasing force of the aperture reset spring 472. When the external force is removed, the aperture lever 402 is rotated counterclockwise by the biasing force of the aperture reset spring 472 and stops at the "stop position of the aperture lever 402 without the lens mounted before shutter release".

---At Shutter Releasing---

Operation of the diaphragm mechanism 400 at shutter releasing is now explained with reference to the timing chart shown in FIG. 10 in addition to FIGS. 1 through 9. Timing of excitation of the mirror up magnet 461 is not shown in the timing chart. When the release button 4 is pressed, a release signal is output from a release switch not herein shown to the control circuit 101. In response to input of the release signal, the control circuit 101 excites the mirror up magnet 461 for a predefined length of time necessary for release of the moving core 461a. This causes the moving core 461a to be released. As the moving core 461a is released, engaging of the mirror up lever 406 is released and the mirror up lever 406 is rotated clockwise by the biasing force of the mirror up spring 473 (FIGS. 5 and 8). Consequently, the arm 406a abuts against a shaft, not shown in the figures, that drives the main mirror 321, and pushes the shaft upward so as to lift the main mirror 321 up.

In response to input of the release signal, the control circuit 101 excites the aperture magnet 434 for a predefined length of time necessary for release of the moving core 434a. This causes the moving core 434a to be released. The aperture reset engaging lever 431 rotates clockwise by the biasing force of the spring 436 and releases engaging of the aperture reset lever 404. The aperture reset lever 404 rotates clockwise by the biasing force of the stop-down spring 471 and presses clockwise the pin 403d, which is provided in the proximity of the sector gear part 403c of the aperture driving lever 403 at the lower end of the arm 404a. Consequently, the aperture driving lever 403 is applied with a biasing force clockwise, that is, in the direction for stop-down.

In response to input of the release signal, at the same time as starting exciting the aperture magnet 434, the control circuit 101 outputs a control signal to the stepping motor driver 102 such that the stepping motor 411 starts rotating in the direction of stopping down. In response to input of the control signal from the control circuit 101, the stepping motor driver 102 starts driving the stepping motor 411 in the direction for stop-down. As a result, at the substantially same time of starting exciting the aperture magnet 434, rotation of the stepping motor 411 is started (FIG. 10). As the stepping motor 411 is driven in the direction for stopping down, the aperture driving lever 403 is rotated clockwise through the aperture first gear 421 and the aperture second gear 422. Drive control of the stepping motor 411 will be hereinafter detailed.

As described above, the excitation of the aperture magnet 434 and the rotation of the stepping motor 411 are to be started at the substantially same time. However, the length of time from the start of the excitation of the aperture magnet 434 until the lower end of the arm 404a of the aperture reset lever 404 abuts against the pin 403d on the aperture driving lever 403 is longer than the length of time between the output of the control signal to the stepping motor driver 102 and the start of the rotation of the aperture driving lever 403 by driving force of the stepping motor 411. This means that after the start of the rotation of the aperture driving lever 403 by driving force of the stepping motor 411, the lower end of the arm 404a of the aperture reset lever 404 presses the pin 403d on the aperture driving lever 403 clockwise. Shortening of the release time lag is thus realized.

In consideration of the length of time from the start of the excitation of the aperture magnet 434 until the lower end of the arm 404a of the aperture reset lever 404 abuts against the pin 403d on the aperture driving lever 403, the output of the control signal for starting driving of the stepping motor 411 to the stepping motor driver 102 may be delayed. In this case, the aperture driving lever 403 is to be rotated by the driving force of the stepping motor 411 at the same time as or after the lower end of the arm 404a of the aperture reset lever 404 starts pressing the pin 403d on the aperture driving lever 403 clockwise. This results in reduction of load at the start of the driving of the stepping motor 411.

As the aperture driving lever 403 rotates clockwise, the arm 403a abuts against the pin 402c on the aperture lever 402 and presses the pin 402c downward. This causes the aperture lever 402 to be rotated clockwise, and stop-down operation to be started. In other words, the clockwise rotation of the aperture lever 402 causes the aperture lever 3 on the lens to stop down the photographic lens 2.

The clockwise rotation of the aperture driving lever 403 causes the arm 405a of the aperture lever pawl 405 to draw apart from the turn part 401b of the board 401. The aperture lever pawl 405 hence rotates counterclockwise by the biasing force of the spring 485. The pawl 405b abuts against the pin 402c on the aperture lever 402 to hold and engage the pin 402c. The aperture lever 402 and the aperture driving lever 403 are engaged each other by the aperture lever pawl 405 and rotate integrally. At stopping down, the aperture driving lever 403 and the aperture lever 402 are driven by the driving force of the stepping motor 411 and the biasing force of the stop-down spring 471.

In response to the control signal from the control circuit 101, the stepping motor driver 102 controls the rotational amount of the output shaft 411a of the stepping motor 411 so as to obtain a desired aperture value. This causes the stepping motor 411 to stop after the output shaft 411a rotates by a predetermined rotational amount. As the stepping motor 411 stops, the aperture driving lever 403 and the aperture lever 402, which is linked with the aperture driving lever by the aperture lever pawl 405, also stop because of the self-locking of the worm gear. As a result, the aperture lever 3 on the lens stops, and thus the desired aperture value of the photographic lens 2 is realized.

After the desired aperture value of the photographic lens 2 is obtained, a shutter (not herein figured) is operated by a known device and a shooting operation is performed. Immediately after a subject image is captured by the CCD 5, a reset operation of each part is performed. The reset operation will be detailed later.

---Drive Control of the Stepping Motor 411 at Stop-Down---

In order to set the aperture of the photographic lens 2 to a desired value, the aperture lever 3 on the lens should be shifted downward by a predefined amount corresponding to the desired aperture value. In other words, the aperture lever 402 should be rotated according to the desired aperture value. Thus, the aperture driving lever 403 should rotate the aperture lever 402 by a predefined rotational amount.

In the state before shutter release, as explained above, the aperture driving lever 403 is held in a state in which the arm 403a is drawn apart from the pin 402c on the aperture lever 402. Therefore, in order to rotate the aperture lever 402 by a predetermined rotational amount (for example, $\theta f$), the aperture driving lever 403 should rotate by an extra rotational amount (for example, $\theta a$) necessary for the arm 403a to abut against the pin 402c. In other words, the aperture driving lever 403 should rotate clockwise by the rotational amount $\theta a$ before starting the stop-down of the photographic lens 2.

Accordingly, in order to set the aperture of the photographic lens 2 to a desired value, the aperture driving lever 403 should rotate by the rotational amount $\theta f + \theta a$, which is the sum of the rotational amount $\theta f$ and the rotational amount $\theta a$, from the "stop position of the aperture driving lever 403 before shutter release." The rotational amount $\theta f$ is hereinafter called "stop-down rotational amount," while the rotational amount $\theta a$ is called "pre-stop-down rotational amount."

The stop-down rotational amount $\theta f$ is obtained by calculating a desired aperture value and a downward displacement of the aperture lever 3 on the lens necessary to obtain the desired aperture value based on an output signal from a photometric sensor not herein figured. The pre-stop-down rotational amount $\theta a$ is determined by the "stop position of the aperture lever 402 with the lens mounted before shutter release" and the "stop position of the aperture driving lever 403 before shutter release." However, the pre-stop-down rotational amount $\theta a$ may not be a fixed value because the "stop position of the aperture lever 402 with the lens mounted before shutter release" may differ depending on the photographic lens 2 to be mounted.

As mentioned above, the aperture driving lever 403 is rotated by the stepping motor 411 via the aperture first gear 421 and the aperture second gear 422. Therefore, rotational amount of the aperture driving lever 403 can be controlled by using the driving amount of the stepping motor 411, that is, the number of drive pulse that the stepping motor driver 102 outputs to the stepping motor 411. However, since the pre-stop-down rotational amount $\theta a$ is not a fixed value, the total number of the drive pulse that the stepping motor driver 102 outputs to the stepping motor 411 at stop-down cannot be determined.

According to the present embodiment, in the diaphragm mechanism 400 the aperture PI 443 detects the start of rotation of the aperture PI blade 442 so as to determine a time point when the aperture lever 402 starts rotating after the aperture driving lever 403 rotates by the pre-stop-down rotational amount $\theta a$. Then, the stepping motor 411 is controlled such that the aperture driving lever 403 is rotated by the stop-down rotational amount $\theta f$ from the point when the start of the rotation of the aperture lever 402 is detected. This causes the aperture lever 402 to rotate by the stop-down rotational amount $\theta f$ from the "stop position of the aperture lever 402 with the lens mounted before shutter release." Thus, the aperture of the photographic lens 2 is set to a desired value by controlling the rotational amount of the aperture driving lever 403, that is, the driving amount of the stepping motor 411.

Specifically, in response to input of the release signal, the control circuit 101 calculates a target aperture value (aperture value setting) of the photographic lens 2 according to the output signal from the photometric sensor not herein figured. The control circuit 101 calculates the stop-down rotational amount θf (or the number of drive pulse corresponding to the stop-down rotational amount θf) of the aperture lever 402 for obtaining the aperture value setting. Then, the control circuit 101 outputs information on the calculated stop-down rotational amount θf (or the number of drive pulse corresponding to the stop-down rotational amount θf) to the stepping motor driver 102. Following descriptions is made assuming that the information on the number of drive pulse corresponding to the stop-down rotational amount θf is output from the control circuit 101. Besides the information on the number of drive pulse corresponding to the stop-down rotational amount θf, the control circuit 101, as described above, outputs a control signal to the stepping motor driver 102 such that the stepping motor 411 starts rotating at the same time as starting exciting the aperture magnet 434 in response to input of the release signal.

In response to input of the control signal from the control circuit 101, the stepping motor driver 102 starts driving the stepping motor 411.

As the stepping motor 411 is started driving, the aperture driving lever 403 is rotated. As the aperture driving lever 403 rotates by the pre-stop-down rotational amount θa, the arm 403a and the pin 402c, which have been apart from each other, abut against each other and then the aperture lever 402 starts rotating. At this time, as explained above, the aperture PI 443 detects start of rotation of the aperture PI blade 442.

If the control circuit 101 detects any change in the state of the output signal from the aperture PI 443, the control circuit 101 outputs a signal that indicates start of the rotation of the aperture lever 402 (aperture lever rotation start signal) to the stepping motor driver 102.

According to the information on the number of drive pulse corresponding to the stop-down rotational amount θf, the stepping motor driver 102 outputs the said number of drive pulse to the stepping motor 411 from the point when the stepping motor driver 102 receives the aperture lever rotation start signal from the control circuit 101. The stepping motor driver 102 subsequently stops the stepping motor 411.

When starting driving of the stepping motor 411, the stepping motor driver 102 outputs the first drive pulse so as to excite a coil (not herein figured) of the stepping motor 411 with 1-2 phase excitation. In order to obtain enough output torque, the stepping motor driver 102 outputs the second or later drive pulse so as to excite a coil of the stepping motor 411 in 2-2 phase excitation (2 phase excitation). When stopping the stepping motor 411, the stepping motor driver 102 outputs the last drive pulse so as to excite the coil of the stepping motor 411 in 1-2 phase excitation. As a response, in the stepping motor 411, a magnet rotor stops rotating at a position where a magnet of the magnet rotor is attracted to a claw-pole (not figured herein). The output shaft 411a thus stops at a stable position. It should be noted that in the case where the necessary positional accuracy can be achieved with 2-2 phase excitation, the stepping motor 411 may be controlled throughout only according to 2-2 phase excitation method without conducting 1-2 phase excitation for stopping or starting driving.

The stepping motor driver 102 outputs drive pulse such that the stepping motor 411 slows down just before it stops. This causes the aperture driving lever 403 and the aperture lever 402 to slow down and then to stop. Consequently, with respect to not only the aperture driving lever 403 and the aperture lever 402 on the camera body 1 but also members that drive lens on the photographic lens 2, the impact to be generated at stopping is reduced, and thus generation of vibration in each member is controlled. The stepping motor driver 102 outputs drive pulse also at reset operation, which is detailed later.

---At Reset Operation---

At reset operation, the control circuit 101 starts driving a sequence motor which is not herein figured. As the sequence motor is driven, charging power of the sequence motor presses the charge roller 482 downward. This causes the charge link board 408 to be drawn downward and the charge lever 407 to be rotated counterclockwise (refer to FIG. 6).

As the charge lever 407 is rotated counterclockwise, the arm 407a abuts against the bending part 404b of the aperture reset lever 404 and presses the bending part 404b counterclockwise. This causes the aperture reset lever 404 to be rotated counterclockwise against the biasing force of the stop-down spring 471. As the aperture reset lever 404 is rotated counterclockwise, the aperture reset spring engaging part 404d draws the other end of the aperture reset spring 472 downward. This causes the aperture reset spring 472 to apply a counterclockwise biasing force to the aperture lever 402 with which one end of the aperture reset spring 472 is engaged and the aperture driving lever 403 that is linked or integrated with the aperture lever 402 by the aperture lever pawl 405.

Even if the aperture driving lever 403 is thus applied with the biasing force for counterclockwise rotation, when the stepping motor 411 is stopped, the self-locking of the worm gear keeps the aperture driving lever 403 and the aperture lever 402 stopped. If the stepping motor 411 is started to drive in the direction of reset, the drive lever 403 and the aperture lever 402 are rotated counterclockwise by the biasing force of the aperture reset spring 472 and the driving force of the stepping motor 411.

The stepping motor 411 is, as mentioned above, designed to start rotating in the direction of reset after the aperture reset lever 404 is rotated counterclockwise and the aperture driving lever 403 is applied with the biasing force that causes counterclockwise rotation. In other words, as FIG. 10 shows, the control circuit 101 outputs a control signal to the stepping motor driver 102 such that the stepping motor 411 is to start driving when a length of time T2 has elapsed since the sequence motor not herein figured started driving.

Depending on the aperture value setting for stopping down, the stop positions taken by the aperture driving lever 403 and the aperture reset lever 404 just before starting of the reset operation vary. Therefore, a length of time between when the sequence motor not herein figured starts driving and when the arm 407a of the charge lever 407 abuts against the bending part 404b of the aperture reset lever 404 varies depending on the aperture value setting for stopping down. In the diaphragm mechanism 400 in accordance with the present embodiment, the control circuit 101 changes the length of time T2 according to the aperture value setting for stopping down.

As the aperture driving lever 403 and the aperture lever 402 are rotated counterclockwise, the arm 402d of the aperture lever 402 presses the pin 441a backward and the aperture PI blade lever 441 rotates counterclockwise. Before the aperture lever 402 reaches the "stop position of the aperture lever 402 with the lens mounted before shutter release," the arm 405a of the aperture lever pawl 405 abuts against the turn part 401b of the board 401 and thus the aperture lever pawl 405 is rotated clockwise. This allows the pawl 405b to draw apart from the pin 402c on the aperture lever 402 and to release the pin 402c so that the aperture lever 402 is rotatable separately from the aperture driving lever 403. The aperture lever 402 rotates to and stops at the "stop position of the aperture lever 402 with the lens mounted before shutter release" by the biasing force of the aperture reset spring 472.

After the pawl 405b releases the pin 402c, the aperture driving lever 403 continues rotating counterclockwise. Then, the aperture driving lever 403 stops at the "stop position of the aperture driving lever 403 before shutter release."

As the charge link board 408 is drawn downward, the boss 408a abuts against the overcharge absorbing lever 433 of the aperture reset engaging lever 431 and rotates the aperture reset engaging lever 431 counterclockwise. This causes the released moving core 434a to be attracted to and retained again by the permanent magnet of the aperture magnet 434. The aperture reset engaging lever 431 engages again the aperture reset lever 404 which is rotated counterclockwise using the abutting part 432a.

When the charge roller 482 is not pressed downward after each member is reset as described above, the charge link board 408 is shifted upward by the biasing force of the spring 484. The charge lever 407 is rotated clockwise according to the displacement of the charge link board 408. The diaphragm mechanism 400 thus ends its reset operation and restores a state in which shutter release is yet to start.

It should be noted that mirror down of the main mirror 321 at reset operation is not herein detailed.

---"Stop Position Before Release of the Aperture Driving Lever 403"---

As described above, the "stop position of the aperture driving lever 403 before shutter release" is defined by a position where the output shaft 411a of the stepping motor 411 stops. Specifically, the "stop position of the aperture driving lever 403 before shutter release" is defined as follows. As the initial position PI blade rotation lever 451 is rotated clockwise by counterclockwise rotation of the aperture driving lever 403, a state of light output from the detection part of the initial position PI 453 changes from a state in which the light is interrupted by the initial position PI blade 452 to a state in which the light is passing through the initial position detection opening 452b. As a result, a signal output from the initial position PI 453 switches from a High signal to a Low signal (FIG. 10).

The control circuit 101 outputs a predetermined number n of drive pulse to the stepping motor 411 from the point of time when the change in the signal output from the initial position PI 453 from the High signal to the Low signal is detected. After outputting the predetermined number n of drive pulse, the control circuit 101 outputs a control signal to the stepping motor driver 102 so as to stop the stepping motor 411. When the change in the signal output from the initial position PI 453 from the High signal to the Low signal is detected, the control circuit 101 outputs a signal (initial position signal) which indicates that the signal output from the initial position PI 453 has been switched from a High signal to a Low signal to the stepping motor driver 102.

Upon receiving the initial position signal from the control circuit 101, the stepping motor driver 102 outputs the predetermined number n of drive pulse to the stepping motor 411 and subsequently stops the stepping motor 411.

In the diaphragm mechanism 400 according to the present embodiment, the aperture driving lever 403 is stopped at the position where the stepping motor 411 is driven in the direction of reset by the predetermined number n of drive pulse from a reference position. The benchmark position is a rotational position of the aperture driving lever 403 (hereinafter called an aperture driving lever initial position) taken when the signal output from the initial position PI 453 is switched from the High signal to the Low signal. Therefore, the rotational position of the aperture driving lever 403 achieved when the stepping motor 411 is driven in the direction of reset by the predetermined number n of drive pulse from the aperture driving lever initial position is the "stop position of the aperture driving lever 403 before shutter release." Thus, the diaphragm mechanism 400 according to the present embodiment regards the aperture driving lever initial position as an original point of the aperture driving lever 403 and defines the "stop position of the aperture driving lever 403 before shutter release" accordingly.

The aperture driving lever initial position is detected by the initial position PI 453 based on an actual rotational position of the aperture driving lever 403 for following reason. In the stepping motor 411, a rotational amount of the output shaft 411a is determined by the number of drive pulse. However, in the case where a phenomenon known and described as step-out occurs for some reasons, even if the number of drive pulse required for release is input to rotate the output shaft 411a of the stepping motor 411 in the direction of reset, the output shaft 411a of the stepping motor 411 is not restored to the rotational phase or position to be taken before shutter release. This will cause troubles such as that the aperture driving lever 403 is not completely restored its original position.

By defining the "stop position of the aperture driving lever 403 before shutter release" with the aperture driving lever initial position as detected above as a reference position, it is possible to prevent the "stop position of the aperture driving lever 403 before shutter release" from deviating even if step-out occurs at release. Unless step-out occurs, the total number of drive pulse at release and the total number of drive pulse at reset are equal to each other, and therefore an output time of drive pulse at release and that at reset are equal to each other (time T1) (FIG. 10).

Unless step-out and the like occur, the number of drive pulse outputted by the stepping motor driver 102 after the signal output from the initial position PI 453 at stop-down switches from the Low signal to the High signal (hereinafter called the number of pulse after passing through initial position) matches with the number of drive pulse outputted by the stepping motor driver 102 before the signal output from the initial position PI 453 at reset switches from the High signal to the Low signal (hereinafter called the number of initial position restoring pulse). However, in the case where the aperture driving lever 403 fails to rotate by a predetermined rotational amount for some reasons, the number of initial position restoring pulse results in smaller than the number of pulse after passing through initial position. In the case where the number of initial position restoring pulse is smaller than the number of pulse after passing through initial position, and the difference is equal to or more than a predetermined number of pulse, for instance, an error message may be displayed on a display (not herein figured) provided on the back side of the camera body 1.

The following operational effects can be achieved by the diaphragm mechanism 400 and the electronic camera according to the present embodiment.

(1) The aperture driving lever 403 is driven by the stepping motor 411 such that the aperture lever 402 that abuts against the aperture lever 3 on the lens of the photographic lens 2 is to rotate. This cuts out the need for controlling a gear train unlike a conventional diaphragm mechanism that engages a pawl with a ratchet wheel of a gear train to brake the gear train. Therefore, for instance, the stop phase of the gear train is not deviated due to, for instance, the pawl abutting against a tooth top part of a ratchet wheel. A desired aperture value is thus realized.

A conventional diaphragm mechanism is configured so as to stop a ratchet wheel rotating at a high speed by engaging a pawl with the wheel. This abrades the ratchet wheel and the pawl. On the other hand, the diaphragm mechanism 400 according to the present embodiment does not include any configuration in which a ratchet wheel that rotates at high speed is stopped by using a pawl, and thus will not cause any wear as caused in a conventional diaphragm mechanism. This improves durability of the diaphragm mechanism 400.

(2) A conventional diaphragm mechanism forcibly stops a ratchet wheel using a pawl while the ratchet wheel is accelerated and rotating at a high speed. In other words, a conventional diaphragm mechanism sharply stops the ratchet wheel without slowing it down. This causes diaphragm blades of the photographic lens 2 to bounce. On the other hand, the diaphragm mechanism 400 according to the present embodiment, just before stopping the aperture driving lever 403, that is, just before stopping the stepping motor 411, they are slowed down and stopped. This prevents diaphragm blades of the photographic lens 2 from bouncing and reduces the time for the bounce to settle down. This is also true when maximizing the aperture. Since the time for one sequence of the shooting can thus be reduced, a frame-speed (the number of frames to be captured per unit time) can be increased.

(3) Timing for starting rotation of the aperture lever 402 is detected. By using the point of detection when rotation of the aperture lever 402 is started as a reference position, the stepping motor 411 is controlled so as to rotate the aperture driving lever 403 by a stop-down rotational amount θf. This enables an aperture of the photographic lens 2 to be set as desired even if the "stop position of the aperture lever 402 with the lens mounted before shutter release" should vary depending on a type of the photographic lens 2 to be mounted. Therefore, a type of the photographic lens 2 to be mounted is not limited. Actually, any photographic lens 2 can be mounted with accurate setting of the aperture.

(4) At stop-down, the aperture driving lever 403 and the aperture lever 402 are driven by the driving force of the stepping motor 411 and the biasing force of the stop-down spring 471. This achieves miniaturization of the stepping motor 411 while maintaining the driving speeds of the aperture driving lever 403 and the aperture lever 402 that affect frame speed.

(5) At stop-down, the aperture driving lever 403 and the aperture lever 402 are arranged to operate integrally by use of the aperture lever pawl 405. With the maximum aperture, the aperture lever pawl 405 releases the pin 402c such that the aperture lever 402 is rotatable separately from the aperture driving lever 403. This allows the aperture lever 402 to stably rotate at stop-down and results in improvement in quality of a subject image. In addition, even if the stop position of the aperture lever 3 on the lens at the maximum aperture changes due to the difference of the photographic lens 2 to be mounted, it can be handled. Therefore, the photographic lens 2 mounted on the camera body 1 is not limited. Actually, any photographic lens 2 can be mounted and thus convenience is improved.

(6) The initial position PI blade rotation lever 451, the initial position PI blade 452, and the initial position PI 453 are configured to detect the aperture driving lever initial position. Regarding the aperture driving lever initial position as an original position of the aperture driving lever 403, the "stop position of the aperture driving lever 403 before shutter release" is defined. This allows the "stop position of the aperture driving lever 403 before shutter release" to be set at a fixed position. Therefore, even if the stepping motor 411 has step-out, the aperture driving lever 403 can be restored in its right position after reset operation without having any negative impact on the next imaging operation.

(7) The lower end of the arm 404a of the aperture reset lever 404 is designed to press the pin 403d on the aperture driving lever 403 clockwise after driving force of the stepping motor 411 starts rotating the aperture driving lever 403. In other words, driving force of the stepping motor 411 is to rotate the aperture driving lever 403 before the lower end of the arm 404a of the aperture reset lever 404 starts pressing the pin 403d on the aperture driving lever 403 clockwise. This allows the aperture driving lever 403 to be rotated instantaneously at release operation, which results in achieving faster frame speed.

(8) At reset, after the aperture reset lever 404 is rotated counterclockwise and the aperture driving lever 403 is applied with a biasing force that causes counterclockwise rotation, the stepping motor 411 is to start to rotate in the direction of reset.

---Variations---

(1) An image captured by the CCD 5 may be displayed in real-time on a display (LCD, etc.) (not figured herein) provided on the back side of the camera body 1. In other words, a mode known and described as a live preview mode may be selected. In this case, even after stop-down operation is started as mentioned above, as long as the live preview image is being displayed, an aperture value of the photographic lens 2 may be adjusted in a following manner.

The control circuit 101 calculates an aperture value based on a result by a photometric sensor not herein figured and calculates a rotation phase or position of the output shaft 411a of the stepping motor 411 that corresponds to the calculated aperture value. The control circuit 101 determines rotation direction of the output shaft 411a of the stepping motor 411 according to information of the calculated rotation phase of the output shaft 411a, and further calculates the number of drive pulse to be output to the stepping motor 411. Then, the control circuit 101 outputs the rotation direction and the number of drive pulse to the stepping motor driver 102 as drive information. The stepping motor driver 102 controls the rotation of the stepping motor 411 in accordance with the drive information from the control circuit 101.

In order to rotate the aperture driving lever 403 and the aperture lever 402 clockwise (stop-down direction), the stepping motor 411 rotates the aperture driving lever 403 and the aperture lever 402 with a help of from the biasing force of the stop-down spring 471. On the other hand, in order to rotate the aperture driving lever 403 and the aperture lever 402 counterclockwise (maximum aperture direction or direction for widening the aperture), the stepping motor 411 rotates the aperture driving lever 403 and the aperture lever 402 against the biasing force of the stop-down spring 471.

In the case where the aperture driving lever 403 and the aperture lever 402 are rotated while the live preview image is displayed, mainly the stop-down spring 471 extends and contracts since a spring constant of the stop-down spring 471 is smaller than a spring constant of the aperture reset spring 472. The stepping motor 411 to be mounted on the diaphragm mechanism 400 is required to be decreased in size and increased in a rotational speed. Therefore, even though necessary torque can be output for rotating the aperture driving lever 403 and the aperture lever 402 against the biasing force of the stop-down spring 471, the stepping motor cannot output torque great enough to extend and contract the aperture reset spring 472. In general, a larger stepping motor (a larger diameter) increases output torque, while it decreases a rotational speed of an output shaft.

An aperture value of the photographic lens 2 is thus configured to be adjusted while a live preview image is displayed. This allows brightness of the live preview image on a display (not figured herein) to be adjusted as desired regardless of change in brightness of a subject or/and an area surrounding the subject. Visibility of the live preview image will thus be improved. A subject image can be captured at the optimal aperture value without resetting the diaphragm mechanism 400 after displaying the live preview image. This enables a subject image to be shot at a timing intended by a user.

(2) In the above embodiments, the aperture driving lever 403 is configured to rotate using the biasing force of the stop-down spring 471 and the aperture reset spring 472. However, the present invention is not limited to the above embodiments. For instance, stop-down operation and aperture opening operation may be performed only by the driving force of the stepping motor 411 without using the biasing force of the stop-down spring 471 and the aperture reset spring 472. It should be noted that, however, since more driving torque of the stepping motor 411 will be required, the stepping motor 411 needs to have a larger diameter and slower rotational speed. As a result, this lengthens the time necessary for stop-down operation and aperture opening operation. Consequently, this example can be adopted to a camera that can keep the frame speed low to a certain extent.

(3) In the above explanations, the aperture PI 443 is to detect the start of rotation of the aperture lever 402. However, in place of the aperture PI 443, an electrical contact may be provided at an abutting part of the aperture PI blade lever 441 against the aperture lever 402. In this case, it is configured such that as the aperture lever 402 rotates clockwise in the illustration, the aperture PI blade lever 441 may rotate counterclockwise, for example, inertially, behind the movement of the aperture lever 402. When the control circuit 101 electrically detects the state of the electrical contact changing from contacting and parting, it may be determined that the rotation of the aperture lever 402 has started.

(4) In the above explanations, a CCD image sensor (CCD 5) is employed for an image sensor. However, other image sensors such as a CMOS image sensor may be adopted. In the above explanations, an electronic camera that captures a subject image by an image sensor is adopted. However, the present invention may be adopted to a silver halide camera that uses a film.

(5) In the above explanations, the stepping motor 411 is a claw-pole PM stepping motor. However, the present invention is not limited to this example. Not only a PM stepping motor but also other stepping motors such as a VR stepping motor or a HB stepping motor may be employed. Not only a stepping motor but also any type of motor used for positioning such as a DC motor or a servo motor may be adopted.

(6) The above embodiments and examples of variations may be combined with one another.

The present invention is not limited to the above embodiments. The present invention includes an aperture control device and a variety of cameras on which the aperture control devices are mounted. The aperture control device includes an aperture first driving member that drives an aperture (diaphragm) of a lens, an aperture second driving member that drives the aperture first driving member, a motor that drives the aperture second driving member via a worm gear, a detection device that detects start of movement of the aperture first driving member, and a motor control device that controls an aperture value of the lens by controlling a rotational amount of the motor after the detection device detects the start of movement of the aperture first driving member. The aperture control device can be configured in a various method such that, after driving the aperture of the lens to set the aperture value as desired, driving of the motor is stopped and self-locking of the worm gear is used to lock the aperture first driving member and the aperture second driving member.

The above-described embodiments are examples, and various modifications can be made without departing from the scope of the invention.

What is claimed is:

1. An aperture control device, comprising:
    an aperture first driving member that controls an aperture of a diaphragm through which light flux passes;
    an aperture second driving member that drives the aperture first driving member;
    a motor that drives the aperture second driving member;
    a detection device that detects start of movement of the aperture first driving member caused by the aperture second driving member driven by the motor; and
    a motor control device that controls an aperture value of the diaphragm by controlling a rotational amount of the motor after the detection device detects the start of movement of the aperture first driving member.

2. An aperture control device according to claim 1, further comprising:
    a worm gear that transmits driving force of the motor to the aperture second driving member, wherein:
    after the motor control device stops the driving of the motor and the aperture value is controlled to a predetermined value, the aperture first driving member and the aperture second driving member are fixed so as not to move using self-locking of the worm gear.

3. An aperture control device according to claim 1, further comprising:
    the motor being a stepping motor; and
    a stop-down biasing device that applies a biasing force on the aperture second driving member such that the aperture is driven in a direction of stop-down, wherein:
    the motor control device controls the aperture value of the diaphragm by controlling a rotational amount of the stepping motor after the detection device detects the start of movement of the aperture first driving member.

4. An aperture control device according to claim 3, wherein:
    the stepping motor drives the aperture second driving member such that the diaphragm is driven in a direction for widening the aperture against the biasing force of the stop-down biasing device.

5. An aperture control device according to claim 3, further comprising:
    an engaging member that engages the aperture first driving member and the aperture second driving member with each other at least when the aperture is stopped down.

6. An aperture control device according to claim 3, further comprising:
    a maximum aperture biasing device that applies a biasing force on the aperture second driving member as the aperture second driving member is driven in a direction for widening the aperture, wherein:
    the motor control device controls rotation of the stepping motor such that the aperture second driving member on which the biasing force is applied by the maximum aperture biasing device is driven in the direction for widening the aperture.

7. An aperture control device according to claim 3, further comprising:
an aperture second driving member initial position detection device that detects an initial position of the aperture second driving member.

8. An aperture control device according to claim 3, wherein:
the motor control device starts rotation of the stepping motor such that the stepping motor drives the aperture second driving member in the direction of stop-down before the biasing force of the stop-down biasing device is applied on the aperture second driving member.

9. An aperture control device according to claim 3, wherein:
the motor control device starts rotation of the stepping motor such that the stepping motor drives the aperture second driving member in the direction for widening the aperture after the biasing force of the maximum aperture biasing device is applied on the aperture second driving member.

10. A camera comprising the aperture control device according to claim 1.

* * * * *